United States Patent [19]

LaPlante

[11] Patent Number: 4,938,509
[45] Date of Patent: Jul. 3, 1990

[54] MULTIPLE PORT FLUID COUPLER

[76] Inventor: Pierre LaPlante, 621 N. Morton, Newberg, Oreg. 97132

[21] Appl. No.: 362,228

[22] Filed: Jun. 6, 1989

[51] Int. Cl.$^5$ .............................................. F16L 35/00
[52] U.S. Cl. ....................................... 285/26; 285/423
[58] Field of Search .................... 285/26, 29, 131, 132, 285/137.1, 327, 328, 325, 67, 423

[56] References Cited

U.S. PATENT DOCUMENTS

| | | | |
|---|---|---|---|
| 838,043 | 12/1906 | Murphy | 285/26 |
| 891,718 | 6/1908 | McMillan | 285/29 |
| 1,161,641 | 11/1915 | Engle | 285/67 X |
| 1,429,593 | 9/1922 | Keehan et al. | |
| 1,593,605 | 7/1926 | Sheafe | |
| 1,604,211 | 10/1926 | Williams | 285/67 X |
| 1,765,683 | 6/1930 | Muend | |
| 3,217,746 | 11/1965 | Voisine | |
| 3,409,045 | 11/1968 | Mckey et al. | |
| 3,520,379 | 7/1970 | Hitchcock | |
| 3,953,057 | 4/1976 | Petzetakis | 285/67 |
| 4,125,278 | 11/1978 | Hargraves | 285/137.1 X |
| 4,630,848 | 12/1986 | Twist et al. | |
| 4,634,151 | 1/1987 | Holt | |
| 4,688,422 | 8/1987 | Wood | 285/137.1 |

Primary Examiner—Dave W. Arola
Attorney, Agent, or Firm—Klarquist, Sparkman, Campbell, Leigh & Whinston

[57] ABSTRACT

An in-line quick connect multiple port fluid coupler is disclosed. The coupler has two identical coupling units. Each coupling unit has a body and an integral tongue. The tongue has a face which is perpendicular to the longitudinal axis of the coupling unit. Fluid passages interconnect the body and the face of the tongue. Each coupling unit mates in a face-to-face relationship with the other coupling unit. Guide pins and seals are used to provide a fluid tight passage between the fluid passages and each opposing face. A sleeve circumscribes the mated coupling units to ensure a secure assembly.

7 Claims, 2 Drawing Sheets

MULTIPLE PORT FLUID COUPLER

TECHNICAL FIELD

This invention relates to a coupler for connecting multiple fluid lines. Specifically a coupler or connector for multiple fluid lines for a dental apparatus is disclosed. The coupler is an in-line quick connect coupler for joining air and water lines.

BACKGROUND ART

Several hand devices in the dental field require air or water or a combination of air and water for operation. These hand devices may be drill motors or irrigation devices. Usually these hand devices have flexible conduits or tubing lines built into the hand devices to connect the hand devices directly to the air and/or water source. This creates several hand devices, each with long conduits for connection to the air and/or water source. A need exists for a releasible in-line quick connect coupling so that different hand devices may be easily and quickly connected and disconnected from a common air and water transmission conduit.

SUMMARY OF THE INVENTION

An in-line quick connect multiple port fluid coupler has two identical coupling units. Each coupling unit has a body portion and an integral tongue portion. The cross section of the tongue portion is one half of the cross section of the body portion. The tongue portion has a face which is along the longitudinal axis of the coupling unit. Multiple fluid passages extend from an outside surface of each body to the face of each coupling unit. Guide pins are located on each face to mate with recesses in the other face to align one coupling unit to the other coupling unit. Seals are provided on the face of the coupling units to seal the passages on one face to the passages on the other face to form a leak proof interface. The coupling units are mated in a face-to-face relationship to produce a continuous fluid passage from the body portion of one coupling unit to the body portion of the other coupling unit. A sleeve fits over the assembled coupling units to lock the units in a face-to-face relationship.

It is an object of the invention to provide an in-line quick connect coupler for connecting fluid lines.

It is a further object of the invention to provide an in-line quick connect coupling unit for connecting both air and water lines.

It is also an object of the invention to provide a coupler for fluid lines wherein two identical coupling units connect in a face-to-face relationship to interconnect fluid passages formed in each coupler unit.

Another object of the invention is to provide a coupler wherein cooperating coupling units mate in a direction normal to the direction of the fluid transmission lines.

Other object and advantages of the present invention will be apparent from the following description of a preferred embodiment thereof and from the attached drawings.

BEST MODE FOR CARRYING OUT THE INVENTION

Figure 1:
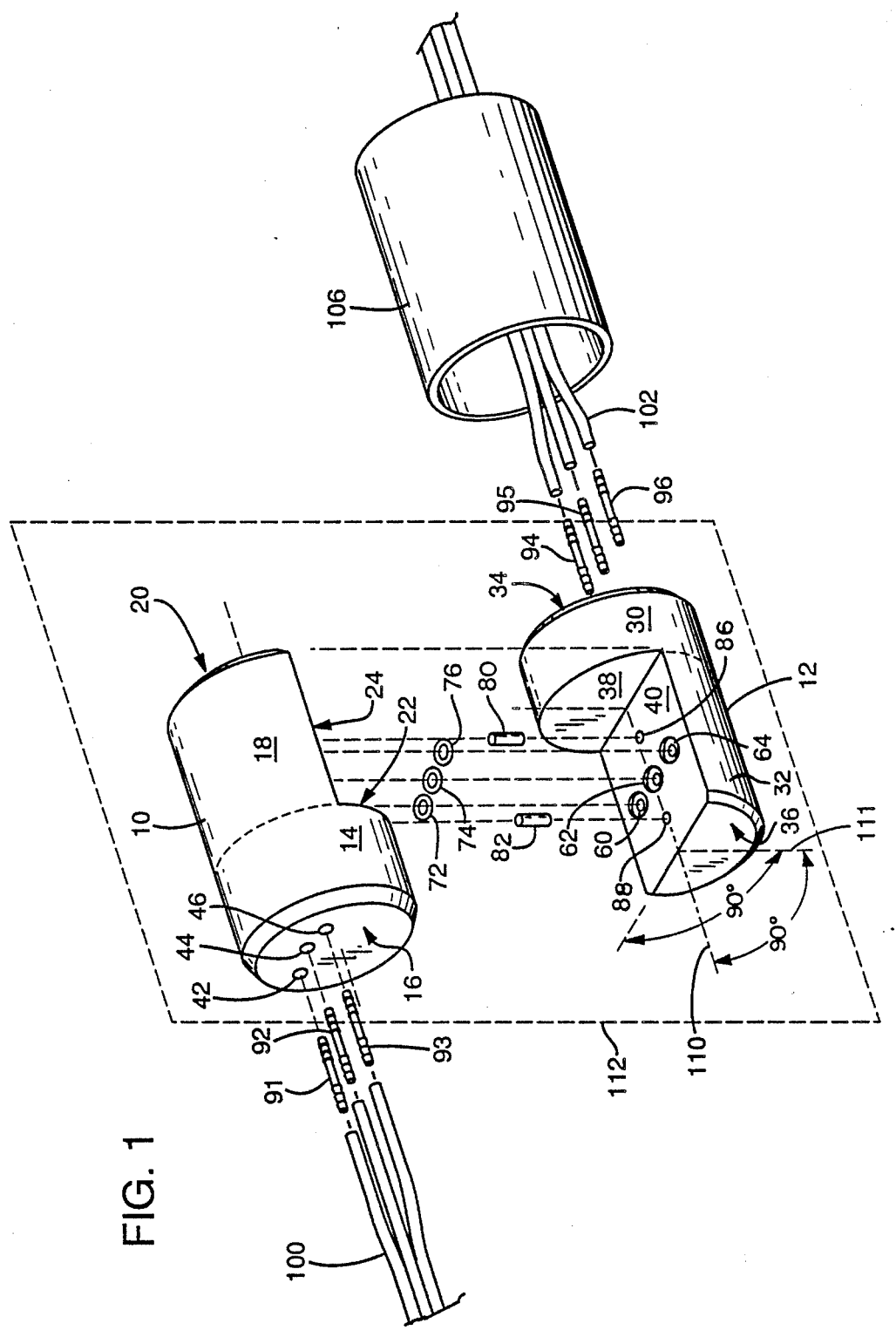
FIG. 1 is an exploded view of the components of the coupler of the present invention.

Referring now to FIG. 1, two identical coupling units 10 and 12 are shown. Coupling unit 10 has a cylindrical body portion 14 with a flat end surface 16. A semi-cylindrical tongue portion 18 is molded integral with body portion 14. The tongue portion 18 has a flat end surface 20, which is approximately one-half the cross sectional area of body surface 16, and a flat mating face 24 which extends along the axis of the coupler unit 10, between the tongue surface 20 and a body surface 22 perpendicular to the face 24.

The other identical coupling unit 12 also has a cylindrical body portion 30 and a semi-cylindrical tongue portion 32. Body portion 30 has a flat end surface 34 while tongue portion 32 has a flat end surface 36, and a second parallel surface 38. A flat mating face 40 which extends along the axis of the coupling unit 12 interconnects surface 38 and surface 36.

Figure 3:
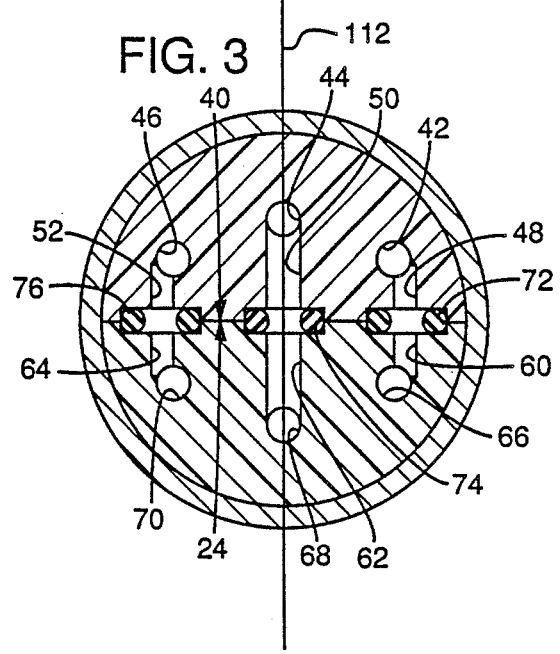
FIG. 3 is a transverse cross section of the assembled coupler along the lines of 3—3 of FIG. 2.

Multiple fluid passages extend from the end surface 16, 34 of the respective coupling units to the respective face 24, 40 thereof. Referring to FIG. 1 passages 42, 44 and 46 can be seen exiting end surface 16 of connector unit 10. Passages 60, 62 and 64 can be seen exiting the flat face 40 of connector unit 12. Referring now to FIG. 3, it can be seen how these passages interconnect. Passage 42 is interconnected by a passage 48 extending inwardly from the flat face 24 of unit 10. Passage 42 may be termed the first end of a fluid passage while passage 48 may be termed the second end of the common fluid passage. Passage 60 similarly is connected to a passage 66 of unit 12 which exits end surface 34. Similarly passage 44 interconnects to passage 50 which exits flat mating face 24 of unit 10 and interconnects with passage 62 in the face 40 of unit 12. Passage 62 is interconnected to passage 68 which exits end surface 34 of unit 12. Passage 46 interconnects with the passage 52 which exits the flat mating face 24 of unit 10. Passage 52 interconnects with passage 64 in the flat mating face 40 of unit 12. Passage 64 interconnects with passage 70 which exits end surface 34 of unit 12.

Sealing O-rings 72, 74 and 76 fit in counterbores at the interface of the mating faces 24, 40. These rings provide a fluid tight seal to seal passage 52 to passage 64, passage 50 to passage 62 and passage 48 to passage 60.

In a preferred embodiment coupling unit 10 and coupling unit 12 are manufactured from a rigid thermoplastic material. In an alternate embodiment, coupling unit 10 and coupling unit 12 may be manufactured from a semi rigid or flexible thermoplastic material and the sealing means may be molded integral with the coupling unit rather than separate elements as shown in the preferred embodiment.

Figure 2:
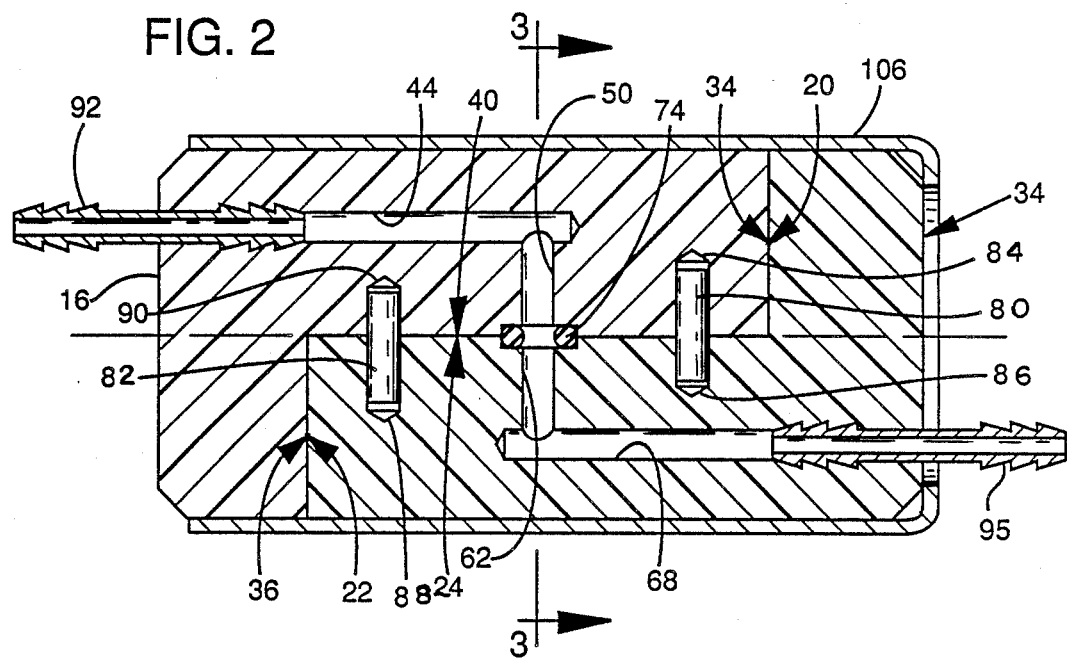
FIG. 2 is a longitudinal cross section of the assembled coupler.

Guide pins 80 and 82 are used to locate the two coupling units in a face-to-face relationship. Referring to FIG. 2, the pin 80 is fixed within a recess 84 in the unit 10 adjacent its end face 20. The pin 82 is fixed within a recess 88 in coupling unit 12 adjacent its end face 36. The pin 80 mates into a recess 86 in coupling unit 12 and the pin 82 mates into recess 90 in coupling unit 10. These locator pins may be molded in place in an alternate embodiment rather than separate elements as shown in the preferred embodiment.

Referring to FIGS. 1 and 2, barbed interconnectors 91, 92, 93, 94, 95 and 96 are used to interconnect the passages in the coupling units to external fluid lines. Particularly, barbed coupling unit 91 fits into fluid passage 42, barbed unit 92 fits into fluid passage 44 and barbed unit 93 fits into fluid passage 46. Barbed units 94, 95 and 96 fit into passages 66, 68 and 70, respectively. Barbed units 91, 92 and 93 interconnect into a multiple fluid supply line 100 while barbed units 94, 95 and 96 interconnect into a multiple fluid supply line 102, one line carrying fluids from sources thereof, the other line carrying fluids to dental handpieces or the like. In an alternate embodiment these barbed units can be molded integral with the body of each of the coupling units.

Once the coupling units are mated in a face-to-face relationship a locking sleeve 106 is slid about the periphery of the coupled coupling units to lock the units together so they cannot be inadvertently disconnected.

It should be noted that the coupling units each have a longitudinal axis 110. The units are symmetrical left to right about this longitudinal axis. Each unit also has a vertical axis 111. The intersection of the vertical axis and the longitudinal axis forms a plane 112. The mating face of each unit is perpendicular to the plane 112. The vertical axis 111 is, of course, perpendicular to the longitudinal axis 110. Each coupling unit is symmetrical about the longitudinal axis 110.

It should be noted that although a circular cross section coupler has been shown, any geometric shape may be used.

Having illustrated and described the principals of the invention in a preferred embodiment it should be apparent to those skilled in the art that the invention ca be modified in arrangement and detail without departing from such principals. We claim all modifications coming within the spirit and scope of the following claims.

I claim:

1. An in-line quick connect multiple port fluid coupler comprising:
   a pair of substantially co-operating coupler units;
   each coupler unit having a plurality of passages formed therethrough and disposed in communication with the passages of the other said coupler unit;
   each passage of each coupler unit having a first end and a second end;
   each said first end of each said passage disposed at a ninety degree angle to each said second end of said passage within each coupler unit;
   a means to seal the passage of one coupler unit to the corresponding passage of the other coupler unit;
   a guide pin projecting from one of said coupler units parallel to the second end of each of said passages cooperating with a recess in the other coupler unit to align one coupler unit for mating with said other coupler unit; and
   a sleeve circumscribing the mated coupler units to retain one coupler unit against the other coupler unit.

2. A fluid coupler as recited in claim 1 wherein each of of said coupler units further comprises;
   a first end having a circular cross section;
   a second end having a semi-circular cross section;
   a flat face across the surface of the semicircular cross section of each coupler unit; and
   the guide pin is a pin projecting perpendicularly from the face of one coupler unit to mate with a recess in the face of the other coupler unit.

3. A fluid coupler as recited in claim 1 wherein the sleeve is a one-piece tubular member adapted to circumscribe the cooperating coupler units when said coupler units have been mated one to the other.

4. An in-line quick connect multiple port fluid coupler comprising:
   a first and a second identical cooperating coupler units;
   each of said coupler units having a first end having a circular cross section and a second end having a semi-circular cross section;
   a flat face across the surface of the semicircular cross section of each coupler unit;
   a plurality of passages through the first end of each coupler unit communicating with a matching plurality of passages in said face of each of said coupler units;
   a pin projecting perpendicularly from the face of each coupler unit to mate with a recess in the face of the other coupler unit to align the face of one coupler unit to the face of the other coupler unit;
   a means to seal the face of one coupler unit to the face of the other coupler unit to produce a fluid tight communication of the passages in the face of one coupler unit to the passages in the face of the other coupler unit; and
   a sleeve circumscribing the mated coupler units to retain the coupler units in engagement with one another.

5. An in-line quick connect multiple port fluid coupler comprising:
   a pair of substantially identical co-operating coupler units;
   each coupler unit having a cylindrical body portion and a semi-cylindrical tongue portion, said tongue portion integral with said body portion;
   each said coupler unit having a longitudinal axis and a vertical axis;
   said longitudinal axis and said vertical axis defining a plane which bisects said coupling unit;
   said coupling unit being symmetrical about said plane;
   a mating face on said tongue portion perpendicular to said plane;
   a plurality of passages through each coupling unit, each passage having a first end on said body portion and a second end at said mating face;
   said coupling units mating in a face-to-face relationship such that the passages in the mating face of one coupling unit mate with the passages in the mating face of the other coupling unit;
   a guide pin projecting from the face of each coupling unit to mate with a recess in the face of the other coupling unit; and
   a sleeve circumscribing the mated coupling units to interlock the coupling units in a face-to-face relationship.

6. A connector as recited in claim 5 wherein the coupling units are made of a thermoplastic material.

7. A connector as recited in claim 5 wherein the sleeve is made of aluminum.